United States Patent [19]

Koishi et al.

[11] Patent Number: 4,609,715

[45] Date of Patent: Sep. 2, 1986

[54] COPOLYMER OF FLUOROMETHACRYLATE WITH STYRENE OR ITS DERIVATIVE AND METHOD OF PREPARING SAME

[75] Inventors: Toshio Koishi, Sakado; Akira Ishihara, Tokorozawa; Takamasa Fuchigami, Sagamihara, all of Japan; Iwao Ojima, East Setauket, N.Y.

[73] Assignee: Central Glass Company, Limited, Ube, Japan

[21] Appl. No.: 735,266

[22] Filed: May 17, 1985

[30] Foreign Application Priority Data

May 24, 1984 [JP] Japan .................. 59-103657

[51] Int. Cl.[4] .................. C08F 212/08; C08F 212/36; C08F 214/18
[52] U.S. Cl. .................. 526/245
[58] Field of Search .................. 526/245

[56] References Cited

U.S. PATENT DOCUMENTS 2,472,811  6/1949  Dickey .................. 260/83
3,386,977  6/1968  Kleiner .................. 526/245

OTHER PUBLICATIONS

Macromolecules 1982, 15, 915–920.

*Primary Examiner*—Harry Wong, Jr.
*Attorney, Agent, or Firm*—Fleit, Jacobson, Cohn & Price

[57] ABSTRACT

An α-trifluoromethylacrylate, which does not undergo radical homopolymerization, is easily and efficiently copolymerized with styrene or its derivatives by using a common radical polymerization initiator. The composition of the resultant copolymer does not greatly vary with the proportions of the monomers subjected to copolymerization and usually is close to an alternating copolymer.

2 Claims, 1 Drawing Figure

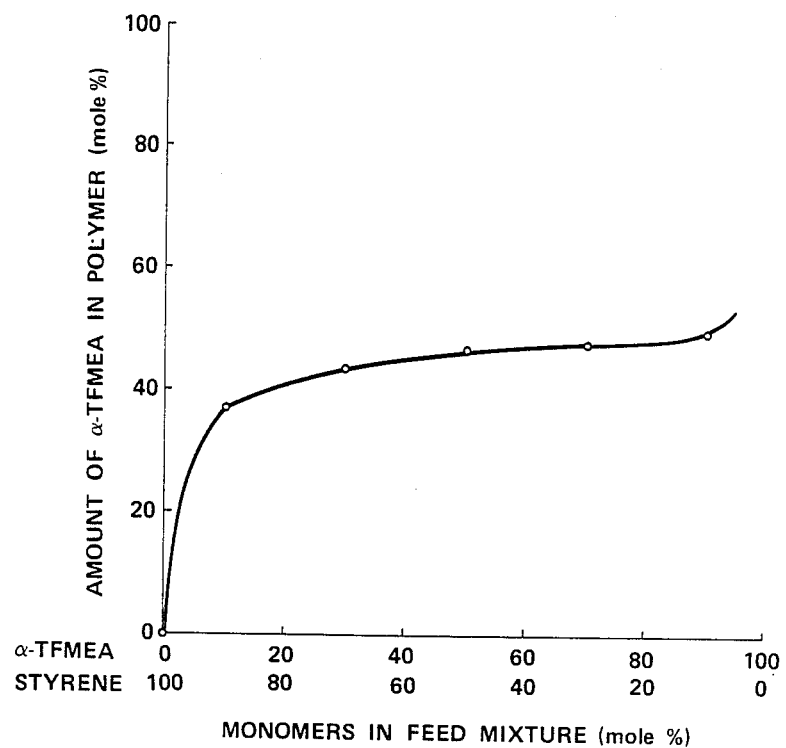

COPOLYMER OF FLUOROMETHACRYLATE WITH STYRENE OR ITS DERIVATIVE AND METHOD OF PREPARING SAME

BACKGROUND OF THE INVENTION

This invention relates to a novel copolymer of a fluorine-containing methacrylate with styrene or its derivative and a method of preparing the same.

Functional polymers of fluorine-containing methacrylic or acrylic esters are attracting increasing interest. Such polymers are expected to have wide applications such as, for example, textile oil using the water- and oil-repelling property attributed to fluorine, fluoro-rubbers using the chemical resistant property, optical plastics using the low refractivity characteristic, resist materials and dental materials. In fact, considerable items have already been developed to the stage of practical applications.

Until now, the aforementioned polymers are mostly of a group of fluorine-containing methacrylates represented by the general forumula (A):

wherein R is hydrogen atom or methyl group, and R' is a partly fluorinated alkyl group. That is, methacrylates having fluorine atoms in the ester group are used. For example, copolymers of a methacrylate containing a perfluoroalkyl group in the ester group with an aliphatic monomer are widely used as water- and oil-repelling agent for treatment of textile.

Another group of fluorine-containing methacrylates represented by the general formula (B), viz. α-trifluoromethylacrylates, are expected to provide functional polymers having unique characteristics.

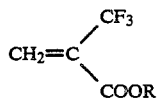

wherein R represents an alkyl group or a fluorine-containing alkyl group.

However, monomers of the general formula (B) cannot freely be polymerized. As reported, for example, in Macromolecules, 15. 915 (1982), these polymers can be polymerized by anionic polymerization using pyridine or n-butyl lithium as initiator, but cannot be polymerized to homopolymers by radical polymerization using a common initiator such as benzoyl peroxide. The same reference reports that radical copolymerization of methyl α-trifluoromethylacrylate with methyl methacrylate is possible but requires a very long reaction time for obtaining a copolymer containing a relatively large amount of the fluoroacrylate with good yield.

SUMMARY OF THE INVENTION

It is an object of the present invention to provide a novel copolymer of an α-trifluoromethylacrylate with another monomer, which copolymer can efficiently be prepared by radical polymerization.

It is another object of the invention to provide a method of preparing a copolymer comprising an α-trifluoromethylacrylate by radical polymerization.

This invention provides a copolymer of a first monomer represented by the general formula (1) with a second monomer represented by the general formula (2):

wherein R represents an alkyl group or a fluorine-containing alkyl group;

wherein X represents hydrogen atom, an alkyl group, a fluorine-containing alkyl group, a halogen atom, vinyl group, hydroxyl group, formyl group, isocyano group, carbonyl group, carbamoyl group or amino group.

(Note: the general formula (1) is identical with the general formula (B) shown hereinbefore.)

When R in the general formula (1) is a fluorine-containing alkyl, it is preferred that R is represented by the general formula (3):

wherein n is an integer from 0 to 5, $R_f$ is a polyfluoroalkyl group having 1 to 20 carbon atoms, and R' is hydrogen atom, an alkyl group having 1 to 7 carbon atoms or the above defined $R_f$.

Preferred examples of the second monomer of the general formula (2) are styrene, divinylbenzene and methylstyrene or vinyltoluene.

In another aspect, this invention provides a method of preparing a fluorine-containing copolymer, the method comprising the step of copolymerizing a first monomer represented by the above defined general formula (1) and a second monomer represented by the above defined general formula (2) in the presence of a radical polymerization initiator.

The present invention is based on our discovery that α-trifluoromethylacrylates readily undergo radical copolymerization with styrene or its derivatives. Furthermore, we have confirmed that a desired copolymer is formed with good yield in a fairly short time suited to industrial practice, and that the amount of the fluorine-containing first monomer in the copolymer is not very far from 50 mole % and usually falls in the range from 30 to 60 mole %. In other words, copolymers according to the invention are close to an equimolar alternating copolymer. The copolymerization according to the invention can be accomplished by using a known radical polymerization initiator in the manner of solution polymerization, emulsion polymerization, suspension polymerization or bulk polymerization. The molecular weight of the copolymer is not specifically limited. It is possible to obtain a wide variety of copolymers ranging from low molecular weight copolymers in the form of oil or grease to high molecular weight copolymers in the form of rubber or plastics.

The fluorine-containing copolymers according to the invention will have wide applications as functional polymers and will be useful, for example as water- and oil-repellant, resist material, cladding material for optical fibers, and oil and grease for special purposes.

BRIEF DESCRIPTION OF THE DRAWING

The single FIGURE is a graph showing the relationship ship between the molar ratio of an α-trifluoromethylacrylate monomer to styrene monomer subjected to copolymerization by a method according to the invention and the composition of the obtained copolymer.

DESCRIPTION OF THE PREFERRED EMBODIMENTS

When R is an alkyl, the general formula (1) represents esters of α-trifluoromethylacrylic acid and aliphatic alcohols. Typical examples are methyl α-trifluoromethylacrylate, ethyl α-trifluoromethylacrylate, n-propyl α-trifluoromethylacrylate, isopropyl α-trifluoromethylacrylate, tert-butyl α-trifluoromethylacrylate, isobutyl α-trifluoromethylacrylate, 2-ethylhexyl α-trifluoromethylacrylate, hydroxyethyl α-trifluoromethylacrylate and glycidyl α-trilfuoromethylacrylate.

Typical examples of the acrylates represented by the general formulas (1) and (3), i.e. esters of α-trifluoromethylacrylic acid and fluoroalcohols, are 2,2,2-trifluoroethyl α-trifluoromethylacrylate, 1H,1H-heptafluorobutyl α-trifluoromethylacrylate, 1H,1H,7H-dodecafluoroheptyl α-trifluoromethylacrylate, 1H,1H-pentadecafluorooctyl α-trifluoromethylacrylate, hexafluoroisopropyl α-trifluoromethylacrylate and heptafluoroisopropyl α-trifluoromethylacrylate.

The other monomer represented by the general formula (2) can be selected from styrene, substitued styrenes having an alkyl group such as methyl or ethyl, a fluorinated alkyl group, a halogen such as fluorine, chlorine or bromine, vinyl group, hydroxyl group, isocyano group, formyl group, carbonyl group, carbamoyl group or amino group directly attached to the benzene ring.

Extremely high purity is not required of the monomers for use in this invention. So far as the monomers are free of such impurities as will be obstructive to common radical polymerization reactions, a purity level of 98% by gas chromatography is sufficient.

In the feed mixture, usually it is suitable that the molar ratio of the α-trifluoromethylacrylate monomer to the styrenic monomer falls in the range from 95:5 to 5:95, and preferably in the range from 80:20 to 20:80. In general, the method according to the invention results in copolymerization of the two kinds of monomers at a molar ratio not far from 1:1 so far as the monomer mixing ratio in the feed is within the wide range as noted above.

In this invention either an oil-soluble radical polymerization initiator or a water-soluble radical initiator can be used, and in either case the initiator can be selected from many kinds of known initiators.

Examples pf useful oil-soluble radical polymerization initiators are organic peroxides such as diisopropyl peroxydicarbonate, tert-butyl peroxypivalate, di-2-ethylhexyl peroxydicarbonate, benzoyl peroxide, lauroyl peroxide, propionyl peroxide, trichloroacetyl peroxide, perfluorobutyryl peroxide and perfluorooctanoyl peroxide, azo-compounds such as azobisisobutyronitrile and azobis-2,4-dimethylvalerone tolyl and organic boron compounds such as triethylboron oxide or peroxide.

Examples of useful water-soluble radical polymerization initiators are hydrogen peroxide, potassium persulfate, ammonium persulfate and ammonium perfluorooctanate, and combinations of such initiator compounds with certain metal salts, i.e. redox type initiators.

In the feed mixture the proportion of the radical polymerization initiator to the monomers is not particularly limited and need not be varied from common values in known radical polymerization reactions.

The solvent for the reaction system can be selected practically freely. In the case of an organic solvent, usually a hydrocarbon or a fluorine-containing compound is used. In the case of using water, it is usual to add a suspending agent or an emulsifying agent for aiding and stabilizing the dispersion of the reactants. The radical copolymerization reaction according to the invention can be carried out at various temperatures ranging from $-30°$ to $100°$ C., but usually it is suitable to carry out the reaction at a temperature in the range from about $0°$ C. to about $70°$ C.

The invention will further be illustrated by the following nonlimitative examples.

EXAMPLE 1

In a 200 ml autoclave provided with electromagnetic stirrer, 16.8 g of ethyl α-trifluoromethylacrylate, (α-TFMEA), 10.4 g of styrene, 100 ml of benzene and 0.16 g of azobisisobutyronitrile were mixed and subjected to polymerization reaction at $60°$ C. for 24 hr under continued stirring. The resultant solution was poured into a large volume of methanol to precipitate a polymer formed by the reaction. The polymer was washed with methanol and dried under vacuum. By weighing after drying, the yield of the polymer was found to be 45% based on the monomers.

Certainly this polymer was a copolymer of α-TFMEA with styrene. By elementary analysis the content of C in this copolymer was found to be 64.75%. This analytical result indicates that in the copolymer the molar ratio of α-TFMEA to styrene was 44:56. This copolymer was subjected to thermal analysis using a differential scanning calorimeter and a thermobalance to find that the loss at $300°$ C. is 5%.

EXAMPLES 2–6

In these examples the copolymerization process of Example 1 was generally similarly performed by varying the molar ratio of α-TFMEA to styrene over the range from 10:90 to 90:10 as shown in the following table, wherein St stands for styrene. In every example the solvent was 100 ml of benzene, and the initiator was 0.16 g of azobisisobutyronitrile. The polymerization reaction was carried out in a glass tube under shaking at 60° C. for 1 hr. The recovery and washing of the formed copolymer were as described in Example 1. The results are also shown in the table. The yields were very low as the reaction time was very short. The FIGURE in the drawing shows the relationship between the molar ratio of α-TFMEA to styrene in the starting mixture and the composition of the obtained copolymer based on the results of Examples 2–6 and below-described Comparative Examples 1 and 2.

COMPARATIVE EXAMPLE 1

As shown in the table, only styrene was polymerized by the same process as in Examples 2–6.

COMPARATIVE EXAMPLE 2

As shown in the table, only α-TFMEA was subjected to polymerization by the same process as in Examples 2–6.

styrene, 120 ml of benzene and 0.16 g of azobisisobutyronitrile were mixed and subjected to polymerization reaction at 60° C. for 24 hr under continued stirring. The resultant solution was poured into a large volume of methanol to precipitate a polymer formed by the reaction. The polymer was washed with methanol and dried. The yield of the polymer was 42%.

This polymer was a copolymer of hexafluoroisopropyl α-trifluoromethylacrylate with styrene, which was found to be composed of 50 mole % of the α-trifluoromethylacrylate and 50 mole % of styrene by elementary analysis.

EXAMPLE 9

In place of the α-trifluoromethylacrylate in Example 8, 22.2 g of 2,2,2-trifluoroethyl α-trifluoromethylacrylate was used. Otherwise, the polymerization and refining process of Example 8 was performed identically. The yield of a resultant copolymer was 49%.

By elementary analysis, this copolymer was found to be composed of 46 mole % of 2,2,2-trifluoroethyl α-trifluoromethylacrylate and 54 mole % of styrene.

|  | Monomers | | α-TFMEA/St | Yield of Polymer | Composition of Polymer (mole %) | |
|---|---|---|---|---|---|---|
|  | α-TFMEA (g) | St (g) | (molar ratio) | (wt %) | α-TFMEA | St |
| Comp. Ex. 1 | 0 | 20.8 | 0/100 | 1.9 | 0 | 100 |
| Ex. 2 | 3.6 | 18.8 | 10/90 | 2.3 | 37 | 63 |
| Ex. 3 | 10.0 | 14.6 | 30/70 | 3.0 | 43 | 57 |
| Ex. 4 | 16.6 | 10.4 | 50/50 | 8.8 | 46 | 54 |
| Ex. 5 | 23.6 | 6.2 | 70/30 | 4.3 | 48 | 52 |
| Ex. 6 | 30.2 | 2.1 | 90/10 | 4.0 | 50 | 50 |
| Comp. Ex. 2 | 33.6 | 0 | 100/0 | 0 | — | — |

As can be seen in both the table and FIGURE, the ratio of α-TFMEA to styrene in the copolymers does not greatly vary with the mixing ratio of the starting monomers and becomes about 1:1 by mole. From this fact it is deduced that the copolymers obtained in Examples 1–6 are close to an alternating copolymer. The yield values in the table indicate that the rate of copolymerization of α-TFMEA with styrene is higher than the rate of homopolymerization of styrene. Comparative Example 2 evidenced that α-TFMEA does not undergo homopolymerization by radical polymerization.

EXAMPLE 7

In the autoclave used in Example 1, 16.8 g of α-TFMEA, 10.4 g of styrene, 150 ml of water and 0.10 g of ammonium perfluorooctanate were mixed and subjected to polymerization reaction at 60° C. for 24 hr under continued stirring. The reaction product was in the form of slurry. The solid component of the slurry was separated by filtration, washed with methanol and dried to obtain a polymer in the form of fine particles. The yield of the polymer was 78%. This polymer was a copolymer of α-TFMEA with styrene, which was found to be composed of 48 mole % of α-TFMEA and 52 mole % of styrene by elementary analysis.

EXAMPLE 8

In the autoclave used in Example 1, 29.0 g of hexafluoroisopropyl α-trifluoromethylacrylate, 10.4 g of

EXAMPLE 10

In place of styrene in Example 9, 10.7 g of p-methylstyrene was used. Otherwise, the polymerization and refining process of Example 9 was repeated identically. The yield of a resultant copolymer was 53%.

By elementary analysis, this copolymer was found to be composed of 47 mole % of 2,2,2-trifluoroethyl α-trifluoromethylacrylate and 53 mole % of p-methylstyrene.

EXAMPLE 11

In place of styrene in Example 9, 11.8 g of divinylbenzene was used. Otherwise, the polymerization and refining process of Example 9 was repeated identically. The yield of a resultant copolymer in the form of fine particles was 68%.

By elementary analysis, this copolymer was found to be composed of 65 mole % of 2,2,2-trifluoroethyl α-trifluoromethylacrylate and 35 mole % of divinylbenzene.

What is claimed is:

1. A radically polymerized copolymer of a first monomer represented by the general formula (1)

wherein R represents $CH_2CF_3$ or $CH(CF_3)_2$, with a second monomer which is an aromatic vinylic compound selected from the group consisting of styrene, p-methylstyrene and divinyl benzene.

2. A copolymer according to claim 1 wherein the molar ratio of said first monomer to said second monomer in the copolymer is in the range from 3:7 to 6:4.

* * * * *